United States Patent [19]
Yamada

[11] Patent Number: 5,737,284
[45] Date of Patent: Apr. 7, 1998

[54] OPTICAL DISC DRIVE HAVING ACCESSING FROM A CURRENT POSITION WITHIN A LEAD-IN AREA

[75] Inventor: Minoru Yamada, Tokyo, Japan

[73] Assignee: NEC Corporation, Japan

[21] Appl. No.: 728,306

[22] Filed: Oct. 9, 1996

[30] Foreign Application Priority Data

Oct. 13, 1995 [JP] Japan .................. 7-265668

[51] Int. Cl.[6] .................. G11B 17/22; G11B 5/596
[52] U.S. Cl. .................. 369/32; 369/58; 360/78.14
[58] Field of Search .................. 369/32, 33, 47, 369/48, 54, 58, 124, 44.25, 44.26, 44.27, 44.28; 360/78.14

[56] References Cited

U.S. PATENT DOCUMENTS

| | | | |
|---|---|---|---|
| 4,496,993 | 1/1985 | Sugiyama et al. | 369/32 X |
| 5,122,999 | 6/1992 | Kimura et al. | 369/32 |

FOREIGN PATENT DOCUMENTS

| | | | |
|---|---|---|---|
| 63-241779 | 10/1988 | Japan | G11B 27/10 |
| 3-88179 | 4/1991 | Japan | G11B 21/08 |

*Primary Examiner*—Paul W. Huber
*Attorney, Agent, or Firm*—Hayes, Soloway, Hennessey, Grossman & Hage, P.C.

[57] ABSTRACT

In an optical disc drive, a rapid access to a target track within a program area is enabled in case of accidental reentry of an optical pick-up into a lead-in area during an access operation. Upon mounting a compact disc, a maximum relative address TLm within the lead-in area is detected and stored in a memory. If it is found during an accessing operation that a current position lies within the lead-in area, a total number of tracks interposed between the current position and the target position within the program area can be obtained based on a current address, the maximum relative address and a target address of the target position, thereby achieving a high speed accessing operation.

4 Claims, 7 Drawing Sheets

OPTICAL DISC DRIVE HAVING ACCESSING FROM A CURRENT POSITION WITHIN A LEAD-IN AREA

BACKGROUND OF THE INVENTION (a) Field of the Invention

The invention relates to an optical disc drive for a compact disc, and more particularly, to an optical disc drive for processing data on a compact disc of a standard CD format by a unique accessing.

(b) Description of the Related Art

An optical disc drive for a compact disc is known in the art as a compact disc player, which is capable of quickly selecting a desired one of a number of musical tunes which are digitally recorded at a high density in a compact disc and of reproducing the selected one with a high fidelity.

A compact disc is generally implemented by a plastic disc measuring 12 cm in diameter and about 1.2 mm in thickness and having a surface in which a pit train corresponding to digital information representing a musical tune is formed at a high density. The data is formed by irradiating the disc surface with a laser radiation in a spiral pattern extending from the disc center to the periphery thereof. In the compact disc, a high density recording can be achieved which can not be achieved by an analog recording of the prior art. On the other hand, the compact disc player is constructed to move an optical pick-up, having a semiconductor laser and a photoelectric transducer, from the inner periphery toward the outer periphery of the disc by using a linear tracking method while rotating the disc at a constant linear velocity (CLV) in order to reproduce a musical tune contained in the disc.

The compact disc has a recording surface, which is divided into three areas in the direction of the radius, including a lead-in area disposed at a radial position from 23 mm or less to 25 mm, a program area disposed at a radial position from 25 to 58 mm and lead-out area disposed at a radial position greater than 58 mm. Each area has an address data, recorded therein, referred to as sub-code Q data. Sub-code Q data in the lead-in area is referred to as TOC (Table of Contents) in which index data such as a number of each tune contained therein (TNO) and an absolute address of the beginning position of each tune (in terms of total time passed as counted from the beginning position of the program area) is recorded. In addition, "0" representing TNO of the lead-in area and a relative address in terms of time are also recorded in the lead-in area.

The program area contains voluminous amount of tune data allowing a stereophonic playback over one hour per side, and has sub-code Q data recorded therein which includes the number of each tune contained therein (TNO), an index number, a relative address (in terms of time passed for each tune) and an absolute address (in terms of time passed since the beginning position of the program area). Finally, the lead-out area has a sub-code Q data in which "AA" representing TNO of the lead-out area, a relative address (in terms of time passed within the lead-out area) and an absolute address (in terms of time passed since the beginning position of the program area) are recorded in the lead-out area.

After the compact disc is mounted on a compact disc player, TOC data within the lead-in area is initially read and is stored in a memory of the player. Since tune data exists only within the program area, an access to the leading position of a tune or intermediate portion of a tune takes place within the program area mainly by employing the absolute address.

Specifically, when accessing from a current position to a target position, the absolute address of the current position is initially read. Then the number of tracks Np (first track number) counted from the beginning position of the program area to the current position is calculated using a given formula and/or numerical table. The absolute address of the target position is obtained from a key input or from TOC data within the memory, and then the number of tracks No (second track number) from the beginning position of the program area to the target position is determined by using the given formula and/or numerical table. Subsequently, the first track number Np and second track number No are subjected to a subtraction (Np–No) to determine the direction for moving the pick-up and calculate the number of tracks to be passed (third track number). In this manner, a high speed access operation is performed utilizing a rough seeking and/or a fine seeking depending on the third track number to be passed.

It is possible that during the access within the program area, the optical disc drive may encounter an accidental oscillation or impact or the optical pick-up may encounter dust on the track or damage in the track, and may be defocussed or flipped from the program area to the lead-in area or the lead-out area. In such an instance, the optical pick-up may be driven into the lead-out area or the lead-in area, as a reverse motion to the intended access operation to the target position. In such a case, there is a difference in the subsequent access rate between the case where the pick-up is driven into the lead-out area and the case where it is driven into the lead-in area. It is to be understood that the area into which the pick-up is driven can be recognized from TNO contained in the sub-code Q data.

Specifically, when the optical pick-up is driven into the lead-out area, since the sub-code Q in the lead-out area has an absolute address recorded therein which continues from the program area, a normal high speed access operation can be relied upon by continuing the access to the target position, presenting substantially no problem.

By contrast, when the optical pick-up is driven into the lead-in area, absence of the absolute address in the lead-in area prevents a distance to the target position from being determined. Accordingly, the program area is approached by an incremental movement in a given amount by repeating a predetermined number of trackjumps. This prevents a major movement such as a rough seeking from taking place until the pick-up returns to the program area, thus presenting a problem in that a high-speed access operation to the target position is interrupted. Such a problem is not limited to the compact disc player, but is similarly applicable to other optical disc drives for a disc of a standard CD format such as a CD-ROM player. To alleviate such inconvenience, Patent Publications No. JP-A-88-241,779 and No. JP-A-91-88,179 propose different access methods.

Referring to FIG. 1, an access method proposed in Publication No. JP-A-88-241,779 will be described. FIG. 1 shows an access processing by a control circuit when an optical pick-up is driven back into a lead-in area in a CD-ROM player. Initially, upon starting after mounting of a disc, the data in the lead-in area is reproduced, and resultant TOC data is stored in a memory. At this time, the control circuit stores a relative address TL of one of data in the lead-in area in a programmed RAM at step S201. At step S202, it awaits a request for a retrieval as may be issued from the outside such as from a personal computer. When such a request is issued, it calculates the number of tracks (track number No) from the starting position of the program area to the target position on the basis of the absolute address of a target position which is requested, at step S203. Subsequently, it determines at step S204 whether sub-code Q data is read in a stable manner. If it is read in the stable manner, it obtains an address Tp of the current position of the optical pick-up on the basis of the sub-code Q data at step S205, and calculates the track number Np counted from the beginning position of the program area to the current position. At step S206, it determines whether the current position of the optical pick-up is within the lead-in area. This determination is made by utilizing the fact that TNO recorded within the lead-in area is "0". If it is determined that the current position is not recorded within the lead-in area, it performs a subtraction (Np–No) at step S207 in which track number No is subtracted from track number Np. At step S208, it determines in which direction the optical pick-up is to be moved from the current position. Subsequently, at step S209, the optical pick-up is actually moved, and at step S210, it is determined whether or not the data retrieval has been completed. If the data retrieval is completed, the operation is then terminated. If the data retrieval is not completed, the operation returns to step S204 again.

If it is found at step S206 that the optical pick-up stays within the lead-in area, the relative address TL of the data position in the lead-in area is compared against the relative address Tp of the current position of the lead-in area at step S211. If it is found that TL<Tp as a result of the comparison, meaning that the current position of the optical pick-up is closer to the program area than the position indicated by the address TL, the address Tp is stored in a memory (programmed RAM) in place of the address TL at step S212. Subsequently, at step 213, a given kick amount is set in order to return the optical pick-up to the program area by a kick operation. Then, the direction in which the optical pick-up is to be kicked is determined at step S214. At step S210, a kick operation is repeated for driving the optical pick-up in the kick amount, thus incrementally returning the optical pick-up toward the program area.

On the other hand, if it is found as a result of the comparison which takes place at step S211 that inequality TL<Tp does not apply, meaning that the current position of the optical pick-up is located further away from the program area than the data position indicated by the relative address TL (NO), the number of tracks NL which are interposed between the beginning position of the lead-in area and the data position indicated by the relative address TL is calculated on the basis of the relative address TL which is previously restored, at step S215. At next step S216, a calculation of No+(NL–Np) is executed on the basis of the track numbers No, Np and NL which are obtained at steps S203, S205 and S215, respectively. The resulting value is determined as a number of tracks which the optical pick-up must traverse. Subsequently, the operation of steps S214, S210 and S209 takes place in the manner mentioned above.

The access method proposed in Publication NO. JP-A-88-241,779 involves a disadvantage in that an accurate number of tracks cannot be determined unless the relative address TL is close to the starting position of the program area as a result of several kick operations which are attempted within the lead-in area. This is because the calculation of a number of tracks NL which are interposed between the beginning position of the lead-in area and the target position indicated by the relative address TL is complicated according to the standard CD format, in which the beginning position of the lead-in area may be anywhere at a radial position less than 23 mm and the initial value of the relative address need not be "0", and accordingly the maximum relative address within the lead-in area cannot be determined.

Next, referring to FIG. 2, an access method proposed in Patent Publication No. JP-A-91-88,179 will be described. FIG. 2 shows an access operation performed by a compact disc player. When a playback is to be commenced for the first time after mounting a disc, TOC data within the lead-in area is read at steps S302 and S303, and subsequently, in order to move the optical pick-up to the program area, a traverse feed of the optical pick-up over a predetermined number (N) of tracks takes place at step S305. At step S301, it is determined whether the optical pick-up has reentered the lead-in area, including the case when it still remains in the lead-in area. If it is found at step S304 as a case of reentry into the lead-in area, it is then determined at step S306 whether the reentry into the lead-in area has occurred in a track jump mode. If the reentry occurred in a traverse mode, a traverse feed over a given number of tracks less then N tracks, for example, over N/2 tracks, takes place at step 307.

On the other hand, if the reentry into the lead-in area occurred in a track jump mode, a track jump feed over a number of tracks less than N/2, for example, N/4 tracks, takes place at step 308. In either case, such an operation is repeated until the optical pick-up enters the program area by such a feed operation.

In the latter access method proposed in Publication NO. JA-A-91-88,179, since the number of tracks as counted from the lead-in area is not calculated accurately, a target position cannot be reached with a single rough seeking, which is a significant disadvantage against a high-speed accessing.

SUMMARY OF THE INVENTION

In view of the foregoing, it is an object of the invention to provide an optical disc drive for a disc of the standard format, which is capable of performing a high-speed access operation to a target position in the event an optical pick-up is accidentally driven into or reenters the lead-in area from the program area during an access operation.

In accordance with the invention, there is provided an optical disc drive for driving a compact disc including a lead-in area having a plurality of tracks addressed by a sequence of relative addresses and a program area disposed adjacent to the lead-in area, the program area having a plurality of tracks addressed at least by a sequence of absolute addresses, the optical disc drive comprising: an optical pick-up movable with respect to an optical disc in a radial direction thereof from a current position to a target track specified from outside for reading data recorded on the target track; a relative address detecting section for detecting a current relative address of the optical pick-up at the current position at least when the optical pick-up stays within the lead-in area; a first storage section for storing a reference relative address in a reference track in the lead-in area defined from a beginning position of the program area, the reference relative address being detected by the address detecting section after the optical disc is mounted on the disc drive; a calculation section for calculating a first number of remaining tracks disposed between the current position and the target track, when the optical pick-up stays within the lead-in area, based on a target address of the target track, the reference relative address and a current address detected by the address detecting section at the current position; and a driving section for moving the optical pick-up from the current position to the target track based on the first number of remaining tracks.

In a preferred embodiment of the optical disc drive according to the invention, if the optical pick-up is driven into the lead-in area from the program area by accident during an access operation, a total number of tracks which are interposed between a current position within the lead-in area to a target position within the program area can be calculated rapidly on the basis of the maximum (reference) relative address, a relative address of the current position after reentry into the lead-in area, and an absolute address of a target position within the program area. On the basis of the total number of tracks thus calculated, the optical pick-up can be rapidly moved from the current position to the target position, utilizing a rough seeking and/or a fine seeking.

The above and other objects, features and advantages of the present invention will be more apparent from the following description.

DESCRIPTION OF THE PREFERRED EMBODIMENT

Figure 1:
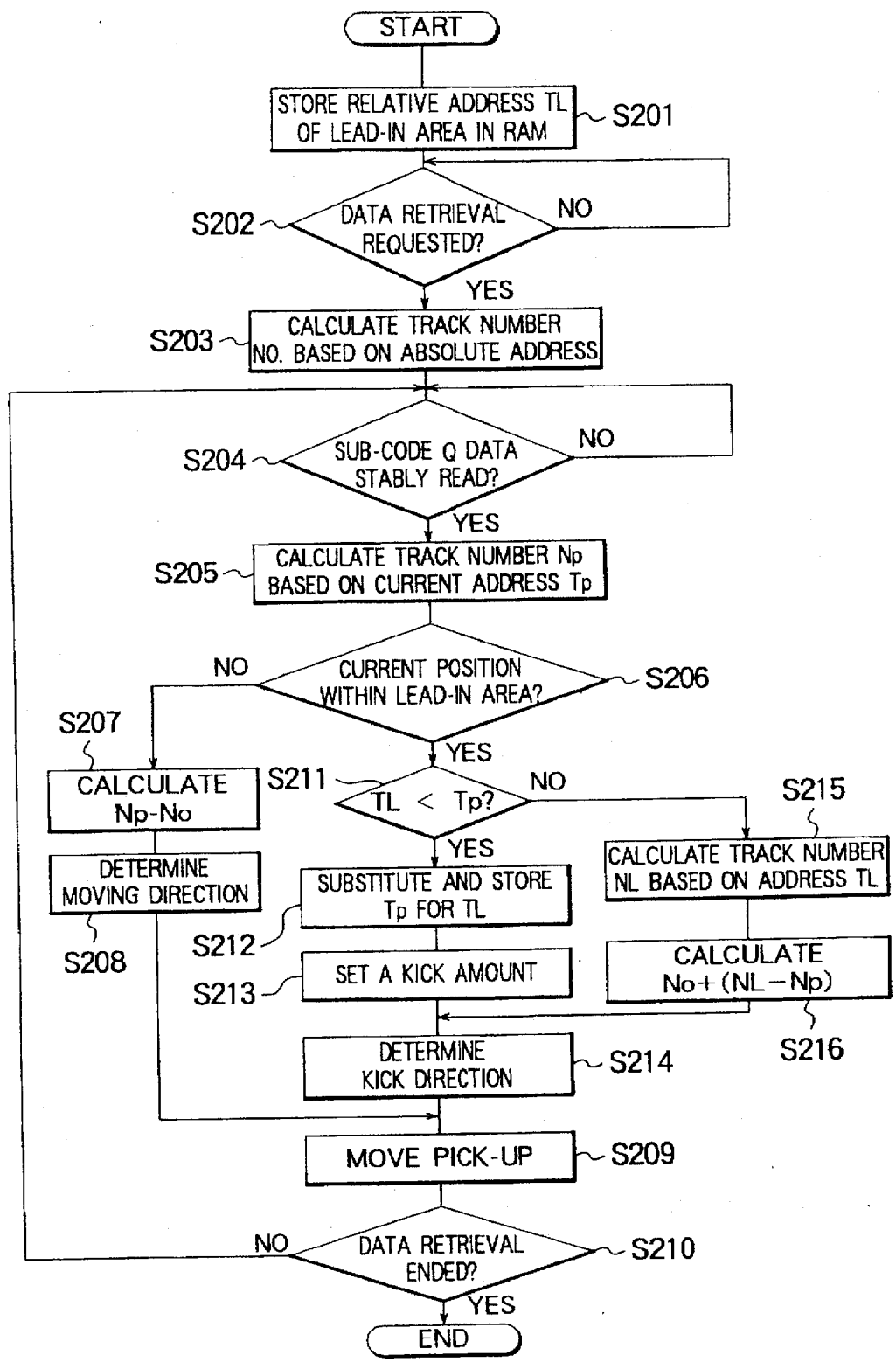
FIG. 1 is a flowchart illustrating an access operation by a control circuit in a conventional CD-ROM player during a reentry into the lead-in area.
Figure 2:
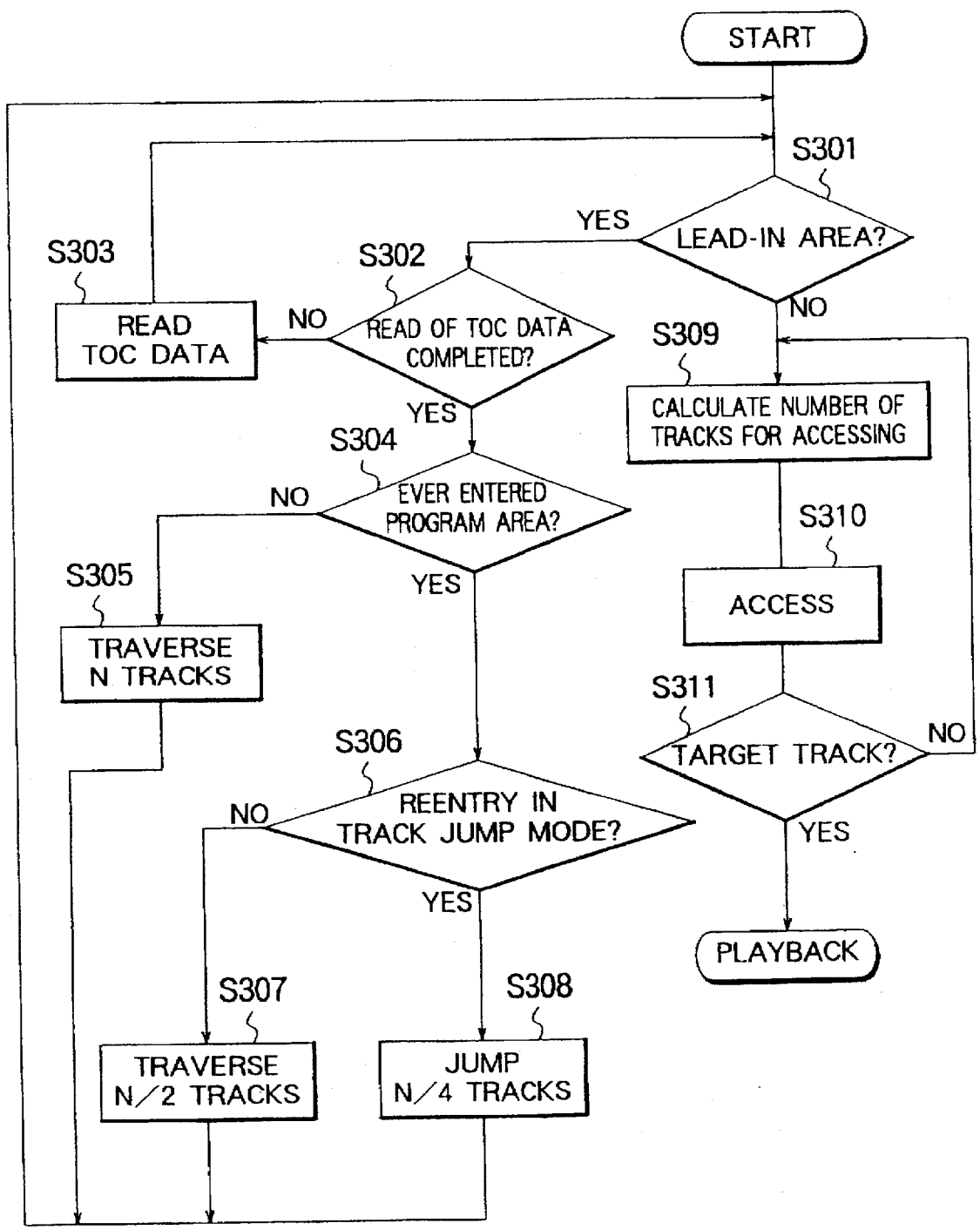
FIG. 2 is a flowchart illustrating an access operation of a conventional compact disc player.
Figure 3:
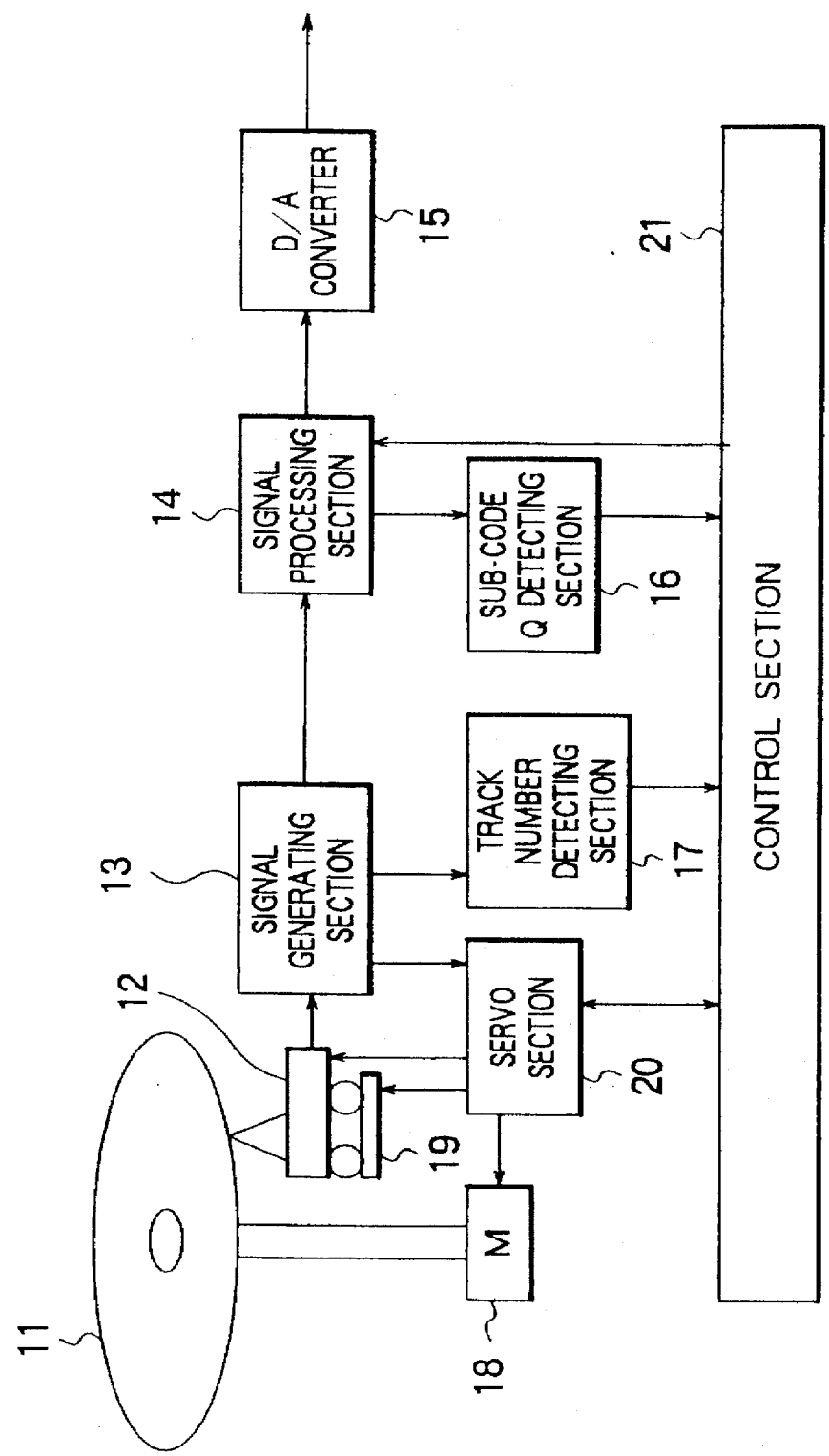
FIG. 3 is a block diagram showing an electrical arrangement of an optical disc drive according to an embodiment of the invention for driving a disc of the standard CD format.

Referring to the drawings, an embodiment of the invention will be described below. FIG. 3 shows an electrical arrangement of an optical disc drive according to an embodiment of the invention for driving a disc of the standard CD format. The optical disc drive of the embodiment may be a compact disc player, CD-ROM drive or the like, and comprises an optical pick-up 12 for reproducing a pit information which is optically written in a disc file 11, a signal generating section 13 for producing RF signal or a servo signal or the like from the pit information which is supplied as an input, a signal processing section 14 which shapes the waveform of an RF signal delivered from the signal generating section 13 to subject it to FEM demodulation as well as 14 bits-to-8 bits conversion for separating a synchronized signal from the demodulated signal, a D/A converter 15 which effects a D/A (digital-to-analog) conversion of the demodulated signal supplied from the processing section 14 to deliver a CDDA signal, a sub-code Q detecting section 16 for detecting a sub-code from the synchronized signal supplied from the signal processing section 14 and for detecting sub-code Q data contained therein, a track number detecting section 17 for detecting the number of tracks traversed by the optical pick-up 12 on the basis of a signal supplied from the signal generating section 13, a servo section 20 for producing a variety of tracking signals on the basis of a servo signal supplied from the signal generating section 13, and a control section 21 which is operable, on the basis of the sub-code Q address delivered from the sub-code Q detecting section 16 and a number of tracks delivered from the track number detecting section 17. The tracking signals are used to apply a focusing servo and/or tracking servo to the optical pick-up 12, to apply a CLV servo to a spindle motor (disc rotating motor) 18 and to apply a linear tracking servo to threading motor (optical pick-up feed motor) 19, for allowing the servo section 20 to drive the threading motor 19 and spindle motor 18 to move the optical pick-up 12 to a target address during a read operation.

Figure 4A:
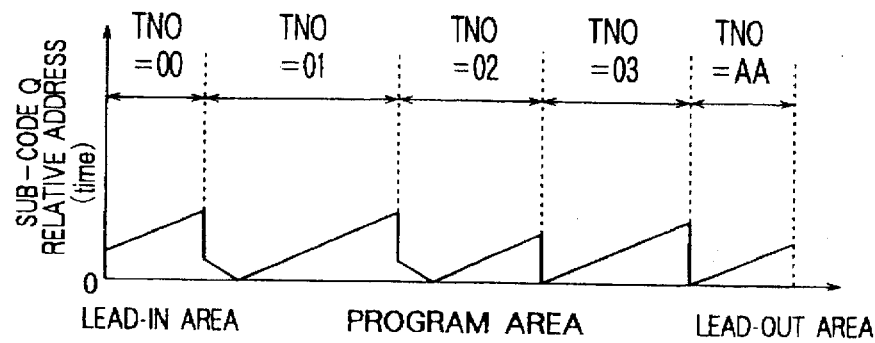
FIGS. 4A, 4B and 4C are schematic diagram of addresses of sub-code Q data recorded in a disc, specifically, FIG. 4A illustrating relative addresses of sub-code Q data for each tune number (TNO), FIG. 4B illustrating an absolute address of sub-code Q data, and FIG. 4C illustrating absolute addresses of sub-code Q data for each area of the disc.
Figure 4B:
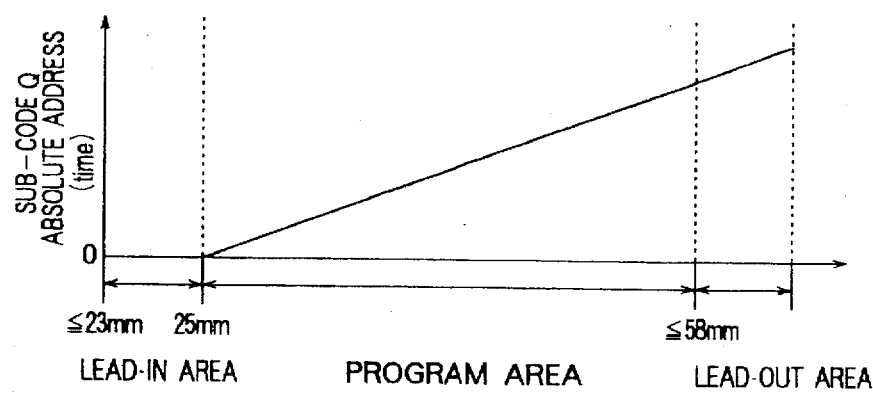
Figure 4C:
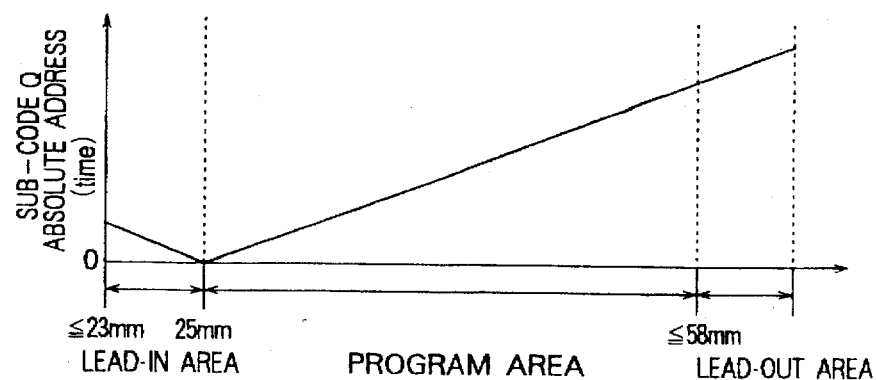
Figure 5:
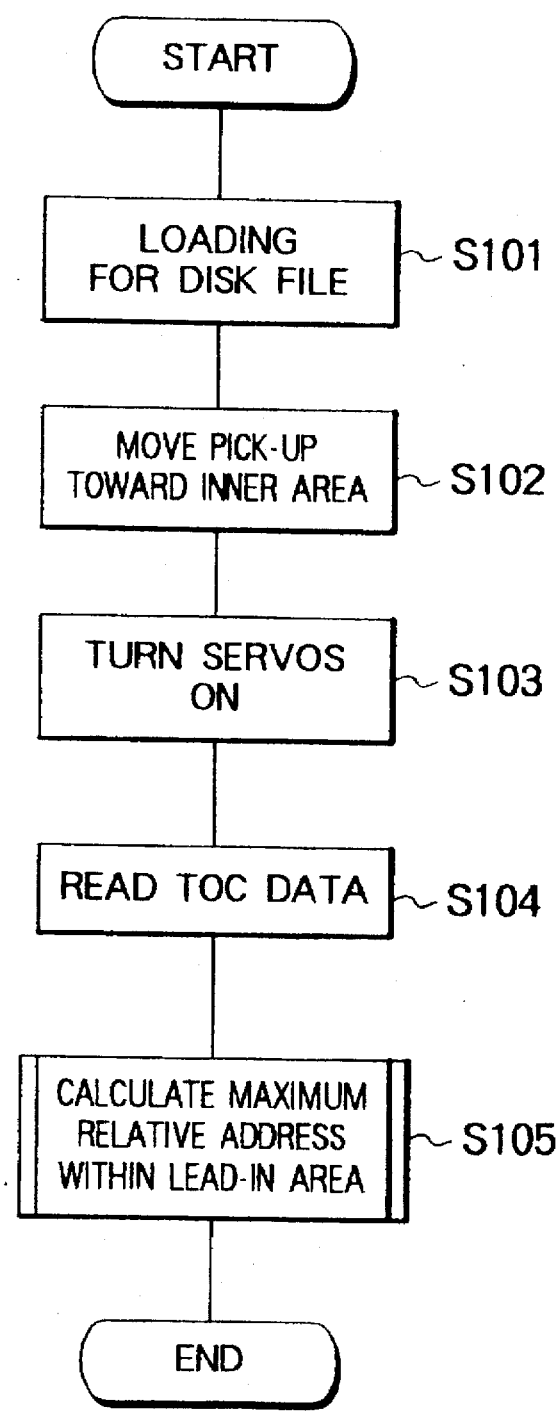
FIG. 5 is a flowchart illustrating a process during an initial operation of the embodiment of FIG. 3.

The operation of the embodiment will be more specifically described below with reference to the drawings. FIGS. 4A and 4B are schematic diagrams for showing addresses for the sub-code Q data which are previously recorded in the disc 11 for the range from the lead-in area to the lead-out area. Specifically, FIG. 4A illustrates relative address recorded in the sub-code Q data corresponding to tune numbers (TNO), and FIG. 4B illustrates the absolute address recorded in the sub-code Q data for the range from the program area to the lead-out area. FIG. 4C is a schematic diagram of the absolute address corresponding to the sub-code Q data which illustrates the operation of the embodiment. FIG. 5 is a flowchart illustrating steps during the initial operation of the disc drive of FIG. 3, and the FIG. 6 is a flowchart of a procedure for detecting a maximum relative address within the lead-in area in the disc drive, and FIG. 7 is a flowchart of steps during the access operation of the disc drive.

During the initial operation, the control section 21 recognizes the mounting of the disc file 11 and performs a loading operation at step S101 in FIG. 5, moves the optical pick-up 12 toward the inner periphery (lead-in area) at step S102 in order to read TOC data, turns on various servos, such as a focusing servo, a tracking servo, CLV servo and a linear tracking servo at step S103, and reads TOC data at step S104. The operation up to the step S104 is similar to the operation of a conventional compact disc player. Subsequently, a maximum value of a relative address within the lead-in area in which TOC data is recorded is detected by calculation at step S105. This is because there is no absolute address recorded within the lead-in area as illustrated in FIG. 4B, and that there is only relative address therein, as illustrated in FIG. 4A.

Figure 6:
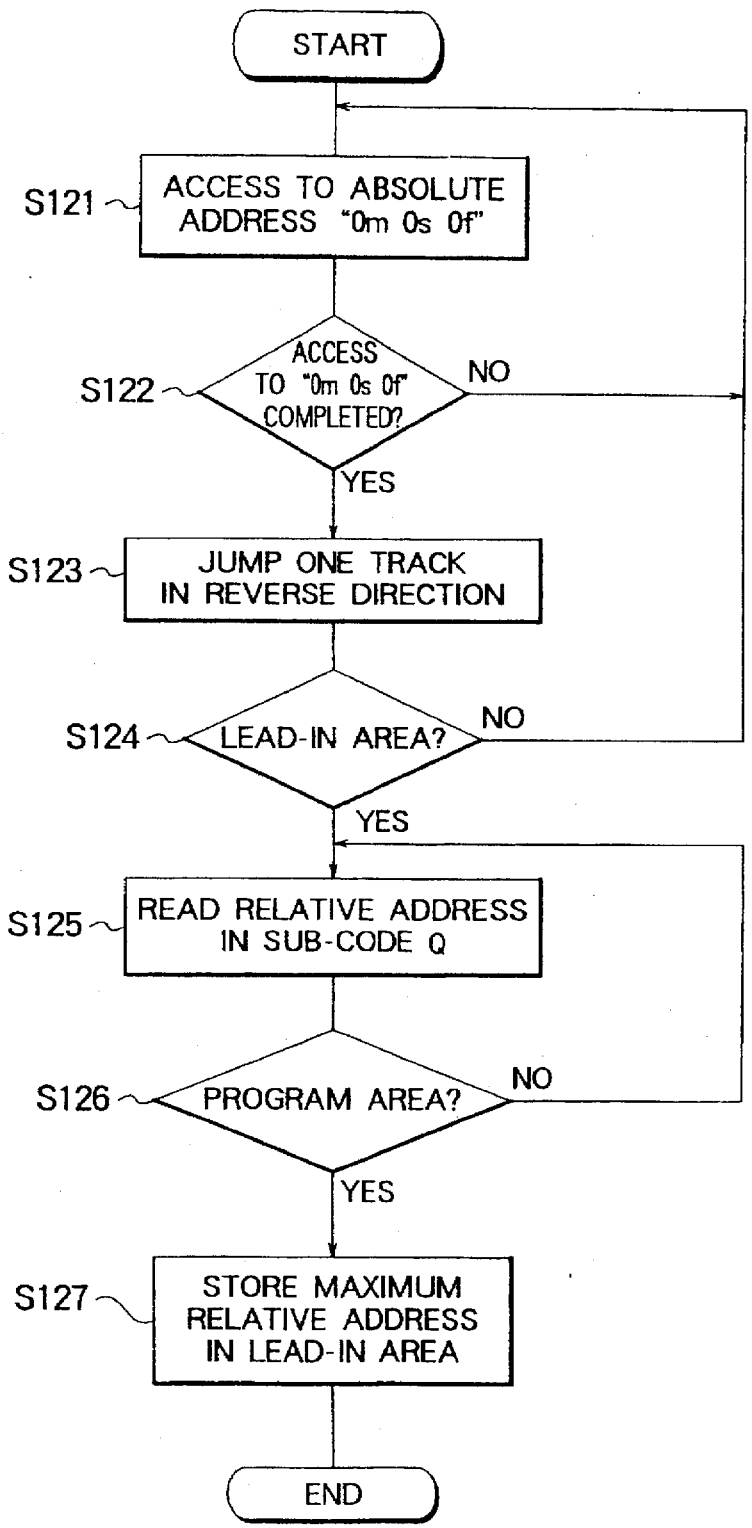
FIG. 6 is a flowchart illustrating a process for detecting a maximum relative address within the lead-in area in the embodiment of FIG. 3.

FIG. 6 corresponds to the detailed routine of the step S105 in FIG. 5. In this routine for detecting the maximum relative address, an access to an absolute address "0 minute 0 second 0 frame", which defines the initial address of the program area, is executed at step S121. At this step, the maximum relative address is not yet determined, and accordingly when moving the optical pick-up from the lead-in area to the program area, a track lump or a thread feed is used in which a number of tracks to be traversed is previously set up. Then, an examination is made at step S122 to see if the access has or has not been completed. If the access to 0.0 m 0 s 0 f. has been completed, the optical pick-up is jumped by one track in a reverse direction or in a direction toward the inner periphery, thereby accessing the lead-in area at step S123. Whether or not the optical pick-up stays within the lead-in area can be determined by examining if TNO of the sub-code Q address data is equal to "00" at step S124. If the optical pick-up stays within the lead-in area, the relative addresses in the sub-code Q data are consecutively read at step S125. During the read-out of the relative addresses, TNO is also checked to detect a change from "00" to "01", to detect the boundary between the lead-in area and the program area at step S126. When it is determined that the optical pick-up has entered the program area, the last relative address within the lead-in area which is read for the last time is stored as the maximum relative address TLm in the lead-in area at step S127, thereby completing the routine of FIG. 6.

Figure 7:
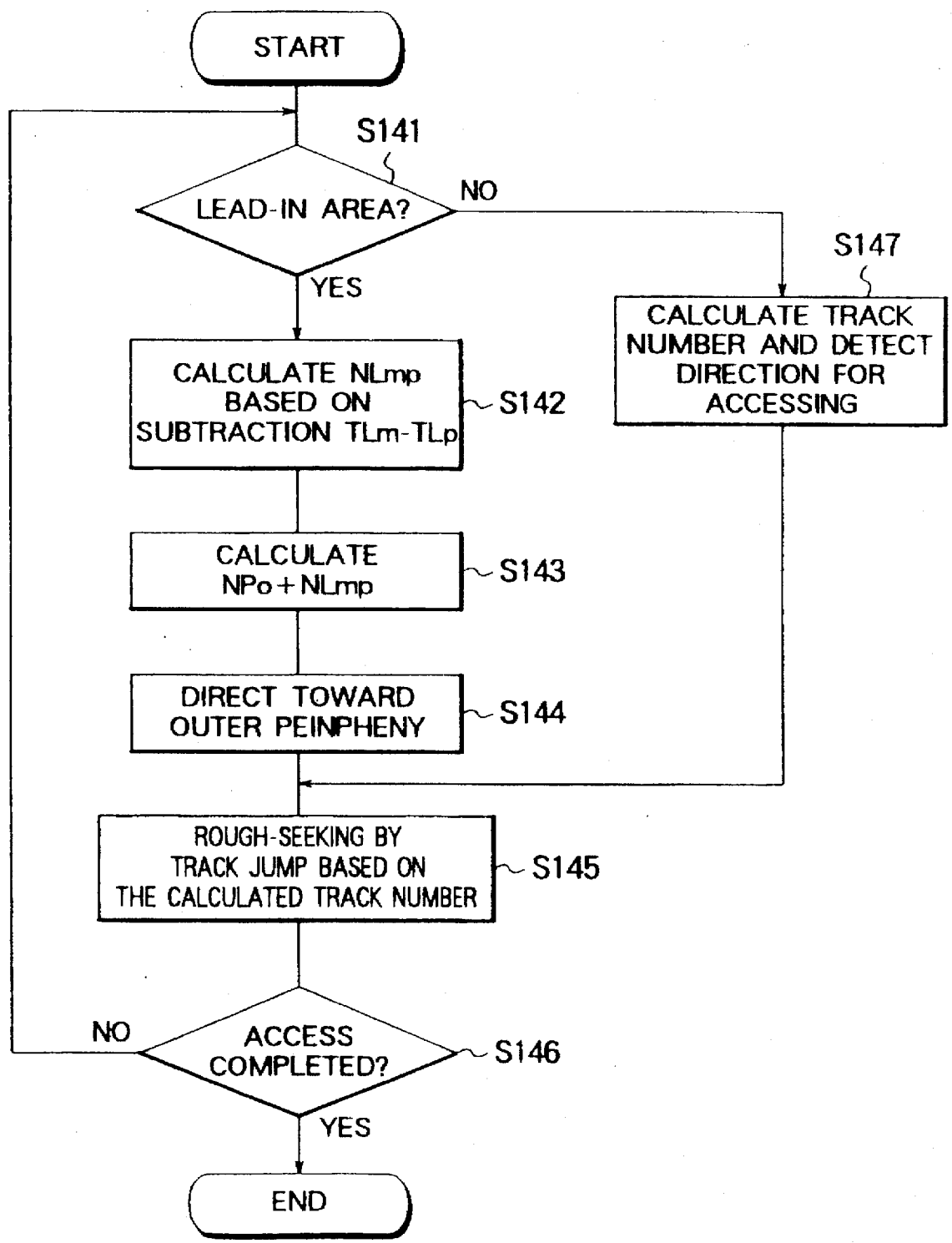
FIG. 7 is a flowchart illustrating a process during the access in the embodiment of FIG. 3.

FIG. 7 shows part of processing operation during the data access subsequent to the detection of the maximum relative address TLm in FIG. 6. If it is determined that the current position of the optical pick-up does not lie within the lead-in area at step S141, a number of tracks (first track number NPp) counted from the beginning position of the program area to the current position and a number of tracks (second track number NPt) counted from the beginning position to the target position are calculated. By calculating a difference therebetween by subtraction (NPp–NPt), a number of remaining tracks (remaining track number) and the direction for accessing are determined at step S147, and an access operation then takes place in accordance with the remaining track number at step S145.

On the other hand, if it is determined at step S141 that the current position of the optical pick-up lies within the lead-in area, a difference (TLm–TLp) between the maximum relative address TLm detected at step S127 in FIG. 4 and the relative address TLp of the current position is calculated, and a number of tracks NLmp which are interposed within the lead-in area between the maximum relative address TLm and the relative address TLp of the current position is calculated on the basis of the difference (TLm–TLp) at step S142.

It is important to note that the position indicated by the maximum relative address is located adjacent to the beginning position of the program area, and accordingly, a difference in the address increases as the optical pick-up moves toward the inner periphery from the maximum relative address, "0 minute 0 second 0 frame", within the lead-in area. Hence, the difference may be regarded as an absolute address to be counted toward the inner periphery, as shown in FIG. 4C. Accordingly, the calculation of a number of tracks within the lead-in area may be made in a manner similar to the calculation of a number of tracks which is executed within the program area. Consequently, by adding the number of tracks NLmp within the lead-in area and the number of tracks NPo interposed between the starting position of the program area to the target position within the program area, it is possible to accurately determine the number of tracks interposed between the current position within the lead-in area and the target position within the program area at step S143.

The direction of the access is established as a direction toward the outer periphery at step S144, and the access operation then takes place in accordance with the total number of tracks (NPo+NLmp) at step S145. The operations from step S141 to step S147 are repeated until the access operation is completed at step S146.

As described above, with the present embodiment, the current position of the optical pick-up within the lead-in area can be represented in terms of an "absolute address", and hence, if the optical pick-up is accidentally driven into or reenters the lead-in area from the program area for some reason during an access operation, a high speed access operation to the target position can be maintained.

While an embodiment of the invention has been described in detail with reference to the drawings, it should be understood that the invention is not limited to the specific construction of the embodiment shown, but that a number of changes, modifications and substitutions therein can be made without departing from the spirit and scope of the present invention.

For example, while the detection of the maximum relative address within the lead-in area has been described in connection with the embodiment by accessing "0 minute 0 second 0 frame" of the absolute address, which is the beginning position of the program area, the invention is not limited thereto, because a track containing the maximum relative address contains data for about 8 frames at minimum, and hence if any one of these relative addresses can be read, the calculation of the number of tracks is possible. Thus, if the presence of a damage in a track or dust on a track prevents the maximum relative address from being read, any one of relative addresses in the track containing the maximum relative address can be used to perform such calculation.

In the described embodiment, an "absolute address" is obtained at step S142 in FIG. 5 in the direction toward the inner periphery within the lead-in area, starting from the maximum relative address, 0.0 minute 0 second 0 frame., because the position indicated by the maximum relative address is located adjacent to the beginning position of the program area. However, alternatively, the beginning position of the program area may be selected as a starting address, 0.0 minute 0 second 0 frame., and an "absolute address" in a direction toward the inner periphery within the lead-in area may also be determined (TLm–TLp+1 frame).

What is claimed is:

1. An optical disc drive for driving a compact disc including a lead-in area having a plurality of tracks addressed by a sequence of relative addresses and a program area disposed adjacent to the lead-in area, the program area having a plurality of tracks addressed at least by a sequence of absolute addresses, the optical disc drive comprising:

an optical pick-up movable with respect to an optical disk in a radial direction thereof from a current position to a target track specified from outside for reading data recorded on the target track;

a relative address detecting section for detecting a current relative address of the optical pick-up at the current position at least when the optical pick-up stays within the lead-in area;

a first storage section for storing a reference relative address in a reference track in the lead-in area, the reference track including a beginning position of the program area, the reference relative address being detected by the address detecting section after the optical disc is mounted on the disc drive;

a calculation section for calculating a first number of remaining tracks disposed between the current position and the target track, when the optical pick-up stays within the lead-in area, based on a target address of the target track, the reference relative address and a current address detected by the address detecting section at the current position; and a driving section for moving the optical pick-up from the current position to the target track based on the first number of remaining tracks.

2. An optical disc drive as defined in claim 1 wherein the reference relative address is a maximum relative address in the lead-in area adjacent to the beginning position of the program area.

3. An optical disc drive as defined in claim 1 wherein the first number of remaining tracks is obtained by adding a second number of tracks disposed between the current position and the reference track and a third number of tracks disposed between the reference track and the target track.

4. An optical disc drive as defined in claim 1 wherein the driving section is adapted to first move the optical pick-up after mounting of the optical disc from the lead-in area to the beginning position of the program area to thereby allow the relative address detecting section to detect the reference relative address.

* * * * *